United States Patent [19] | [11] 4,309,081
Camlibel et al. | [45] Jan. 5, 1982

[54] DISPLAY DEVICES

[75] Inventors: Irfan Camlibel, Stirling; Shobha Singh, Summit; LeGrand G. Van Uitert, Morristown; George J. Zydzik, Warren County, all of N.J.

[73] Assignee: Bell Telephone Laboratories, Incorporated, Murray Hill, N.J.

[21] Appl. No.: 43,167

[22] Filed: May 29, 1979

[51] Int. Cl.³ .......................... G02F 1/17; G02F 1/23
[52] U.S. Cl. .................................... 350/357; 252/408
[58] Field of Search ......................... 252/408; 350/357

[56] References Cited

U.S. PATENT DOCUMENTS

| | | | |
|---|---|---|---|
| 3,451,741 | 6/1969 | Mamoo | 350/357 |
| 3,819,252 | 6/1974 | Giglia | 252/408 |
| 3,912,368 | 10/1975 | Ponjeé et al. | 350/357 |
| 3,951,521 | 4/1976 | Fimdl | 350/357 |
| 3,963,314 | 6/1976 | Yamashita | 350/357 |
| 4,013,343 | 3/1977 | Jaccard et al. | 350/357 |
| 4,039,255 | 8/1977 | Yamashita | 350/357 |
| 4,116,535 | 9/1978 | Ponjeé et al. | 252/408 |
| 4,139,276 | 2/1979 | Clecak et al. | 252/408 |
| 4,175,837 | 11/1979 | Yano et al. | 252/408 |
| 4,192,581 | 3/1980 | Yaguchi et al. | 350/357 |

*Primary Examiner*—Teddy S. Gron
*Attorney, Agent, or Firm*—Walter G. Nilsen

[57] ABSTRACT

Display devices are described which contain organic quinones or diones as active material. These devices exhibit high optical contrast, pleasing and striking colors and unusually low power consumption. Particularly advantageous is the fact that these display devices may exhibit non-linear behavior (sharp thresholds) which permit multiplexing. This is highly advantageous in display device applications.

26 Claims, 1 Drawing Figure

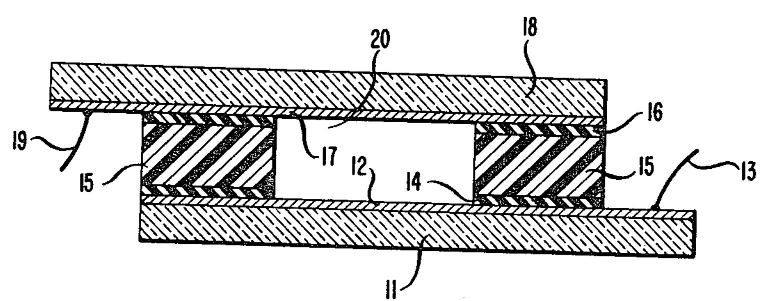
20
18
16
19
17
12
14
15
15
13
11

DISPLAY DEVICES

TECHNICAL FIELD

The invention is an electrochemical display device.

BACKGROUND OF THE INVENTION

The development of various integrated circuit devices such as calculators, watches, microprocessors, etc. has increased the importance of display devices. These integrated circuit devices and other similar devices process or store information which often requires rapid and frequent reading. Particularly desirable in such display devices are low power consumption, good visibility (high contrast and large viewing angle) and low cost. Particularly important in battery operated devices such as calculators and watches is low power consumption. Various systems are useful in display devices, including ferroelectric ceramics, liquid crystals and various electric systems such as electrochemichromic systems. Although these systems may be satisfactory for many applications, the need remains for greater optical contrast, more distinctive color, and lower power consumption. Particularly important is versatility in applying power to the device system (trading current for voltage, pulse operation etc.) and ability to form a multiplexable display system.

SUMMARY OF THE INVENTION

The invention is a versatile display system in which the electrolyte comprises a suitable solvent, organic quinone as active electrochromic material and salt that acts as electrolyte and source of cations and oxidizable anions. Organic quinones are well known in the literature. They may be defined as unsaturated cyclic diketones with both oxygen atoms attached to carbon atoms in simple, fused, or conjugated ring systems—See *The Encyclopedia of Chemistry*—Clark & Hawley, Reingold 1957. It is believed that the organic quinone changes oxidation level (is reduced) by the action of an impressed electric signal so as to produce the colored state used in the display. Although a variety of cations can be used for charge balance, it is preferred to use those that do not attack cell electrodes during operation. Preferred electrolytes include ammonium halides and quaternary ammonium salts, such as tetrabutylammonium iodide, tetrahexylammonium iodide and tetraheptylammonium iodide. Also, an opacifier may be added. Preferred opacifiers generally comprise insulator substance and semiconductor substance. Display devices made in accordance with the invention exhibit high optical contrast, strong coloration, and particularly low power consumption. In addition, such display devices can exhibit sharp thresholds generally near 1.5 V which are suitable for use in multiplexing or thresholds below 0.1 V that are useful for applications in low voltage devices.

BRIEF DESCRIPTION OF THE DRAWING

The FIGURE shows a sectioned side view of a display device made in accordance with the invention.

DETAILED DESCRIPTION

In its broadest aspects, the invention is the use of certain organic quinone substances as the active material in electrochemical display devices. A large variety of quinones are useful provided the ordinary state (uncharged) is colorless or light in color and the charged state is colored. Choice of organic quinone usually depends on color selection and device stability. Organic quinones with up to 100 carbon atoms are useful in display devices. Typical active organic materials are benzoquinone, naphthaquinone, anthraquinone, benzanthrenequinone, diphenoquinone, diphenylquinone, dibenzanthraquinone, phenanthrenequinones, benz-[α]anthracene-7,12dione and substituted variations of these materials. Other quinones are violanthrone, isoviolanthrone, pyrenequinone, perylenequinone, chrysenequinone, pyrenequinone, benzpyrenequinone, pyranthrone, flavanthrone and anthanthrone. The quinone groups (di-ketones) may be located in various places in the molecule consistant with stability (e.g., 1,2-anthraquinone, 1,4-anthraquinone and 9,10-anthraquinone). Other typical quinones are disclosed in a book (2 volumes) entitled *The Chemistry of the Quinonoid Compounds* edited by Saul Patai, John Wiley and Sons 1974. A large variety of substituents may be attached to the organic quinones provided the compounds remain stable and are compatible with the display device.

Excellent results have been obtained with organic quinones with three to six aromatic rings (e.g., anthraquinone, benzanthraquione etc.). A stabilizing effect is obtained by introducing certain substituents onto the aromatic rings. These substituents include hydrocarbon substituents such as other aromatic rings, aliphatic rings and straight chains and heterocyclic rings. Good results are obtained with alkane chains such as methyl, ethyl, tertiary butyl etc. Typical compounds which are readily available, pleasing in color and stable are tertiary butylanthraquinone, ethylanthraquinone, and benzanthraquinone. In addition to organic quinone, the display device contains solvent, electrolyte such as quaternary ammonium salts, ammonium halides, alkali halides, etc., and optionally an opacifier made up of insulator and/or semiconducting substance. Also, silver halide (preferably silver iodide) may be added to the electrolyte as may a halide such as iodine.

A large variety of solvents are useful in the display device. Preference is given to solvents that are highly stable to the chemical and physical conditions present in the display device. In particular, it should not decompose under the influence of the voltages used in the device nor react destructively with the other ingredients in the display device. It should provide good solubility for the organic quinones used in the display device and the various electrolytes used. The solvent should preferably have a large liquid range above and below room temperature (preferably melting point less than −40 degrees C. and boiling point greater than 120 degrees C.).

The solvent should not easily give up protons (it should exhibit a very low concentration of dissociable protons) so as to prevent deterioration of contacts by reducing protons to elemental hydrogen. Proton concentrations should be at least two order of magnitude less than that of pure water. It is preferred that the equivalent pKa value in water should be greater than 9 and more preferably greater than 12.

Typical solvents are dimethyl and diethyl sulfoxide, N,N-dimethyl and N,N-diethyl formamide, diethyl malonate, ethyl acetoacetic ester, ketones such as acetone, esters, ethers and alcohols with high pKa values. Also useful are organic carbonates such as propylene carbonate, organic lactones, organic nitriles such as acetonitrile, nitrohydrocarbons such as nitromethane, etc.

The solvents dimethylsulfoxide and N,N-dimethyl formamide are preferred because of high solubility for the electrolyte and stability. One of these solvents (dimethylsulfoxide) has the advantage of great solubility for the electrolyte. This solvent is preferred only when the temperature of operation does not fall below zero degrees C. Mixed solvents may be used (i.e., a mixture of dimethylsulfoxide and N,N-dimethyl formamide) to obtain the advantage of high solubility and extend the temperature range of operation by lowering the melting point.

Any electrolyte may be used which is compatible with the other ingredients in the display device. Alkali-metal halides such as NaCl, KBr, NaI are useful as are ammonium halides such as $NH_4I$. Quaternary ammonium salts (iodide, bromide and chloride) are also useful including for example tetrabutyl ammonium iodide. Mixtures of the above salts (e.g., ammonium iodide and tetrabutyl ammonium iodide and tetrabutyl ammonium bromide) are also useful. Silver halides such as silver iodide are also useful particularly where a sharp threshold is desired.

The presence of small amounts of ammonium halide, particularly ammonium iodide, greatly enhances display quality, especially contrast.

Concentrations ranges for the organic quinone should be as high as possible without causing precipitation. Typical ranges are about $\frac{1}{4}$ the concentration for saturation (for a particular solvent and temperature) to saturation. Precipitation should be avoided. Mixtures of organic quinones may be advantageous as for example to obtain a particular color or shade. It is preferred that the electrolyte be within 50 percent (on a molecular basis) of the saturation concentration.

Optionally, an opacifier may be added to the liquid part of the electrolyte to improve contrast ratio, lower power requirements and improve device reliability and lifetime. The opacifier may be composed entirely of semiconductor material particularly if particle size is small enough to keep particles dispersed. It may also be composed entirely of insulator-type substance. Alternatively, it may be composed of two types of solid substances, one a semiconducting type and one an insulating type substance. The substances should be stable to the environment of the display device, particularly the driving voltage. It is believed that in addition to improving contrast, the semiconductor part of the opacifier acts as a dispersive contact facilitating in depth precipitation of fine colored particles.

A large variety of substances may be used as the semiconducting substance including the doped counterpart of various insulating substances, such as $TiO_2$, $Ta_2O_5$, $Nb_2O_5$. Either p-type or n-type may be used. Preferably, the semiconducting substances should have conductivities of at least $10^{-9}$ mhos/cm under an applied voltage at room temperature. Higher conductivities are preferred because of more rapid switching of the display and greater contrast of the display. Typical higher conductivities are at least $10^{-8}$ mhos/cm or even at least $10^{-7}$ mhos/cm. Higher conductivities up to about one mhos/cm also can be very useful. Conductivities often vary with applied voltage perhaps due to surface charge states. Upon injection of electrons during the application of voltage, the semiconductor often becomes lightly colored, increasing its conductivity during the coloring cycle. The semiconducting substance should also preferably be white or light colored in the non-active regions to provide maximum contrast with the quinoide salt making up the display. The semiconducting substance should be insoluble in the electrolyte and not be irreversibly affected by the conditions (voltage, electrode action, etc.) of the display device.

The insulating substance should preferably be white or light in color in order to provide maximum contrast with the substance plating out during operation of the display device. It should also be inert to the chemical and physical conditions of the display device, as described above, and preferably be sufficiently reflective to enhance the contrast for the display.

The concentration of the semiconductor and insulator substances in the opacifier may vary over large limits and still provide excellent device performance. Preferred concentrations often depend on the properties of semiconductor used, the particular semiconductor substances used, and the properties and identity of insulator substance used. Preferred concentration ranges for typical semiconductor and insulator substances are 1 to 90 weight percent semiconductor remainder insulator. Better results are obtained using a concentration range from 20 to 70 weight percent semiconductor, remainder insulator, particularly for 4 A molecular sieve and $A_2O_3$ or mixtures of these two insulator substances. Best results are obtained using 40 to 60 weight percent semiconductor remainder insulator substance.

Small particle size is also highly advantageous because of the increased dispersion of the deposits, and resolution of the display. Particle sizes less than five microns are preferred. Generally, semiconductor substances and insulator substances have a range of particle sizes. For the display systems described here, it is preferred that the average particle size is less than five microns. Still smaller particle sizes are advantageous where obtainable in a suitable semiconductor or insulator substance. For example, for either semiconductor or insulator substance, average particle size less than one micron is even more preferred.

A large variety of materials may be used as the semiconducting substance including mixtures of various substances. High optical index of refraction is preferred because of greater reflecting characteristics which increase the optical contrast of the display device. Preferred are white transition-metal oxides such as $TiO_2$, $GeO_2$, $ZrO_2$, $Nb_2O_5$ and other compounds containing Ti, Ge, Zr, Nb and Ta. Transition metals are metals with partially filled d shells. These substances should contain impurities or dopants to make them semiconducting. The selection of impurity depends on the basic substance chosen. For example, the valence of the impurity or dopant cation should either be less than (for p-type semiconductor) or greater than (for n-type semiconductor) the cation of the basic substance. Also, the ionic radius of the impurity cation should be approximately the same as the cation of the basic substance.

Although the impurity concentration in the semiconductor substance may vary over large limits, particularly good results are obtained in the range of 0.001 to 1.0 weight percent. For typical semiconductors, best results are obtained in the range from 0.005 to 0.025 weight percent.

A particular good and low cost semiconductor material is reagent grade $TiO_2$. This grade $TiO_2$ has sufficient impurities to make it semiconducting. Various impurities may be used as described above. A particularly effective impurity for $TiO_2$ is iron in the concentration range of 0.005 to 0.025 weight percent.

Various insulating substances may be used provided they are insoluble and inert to the conditions of the display device. Again, high reflectivity and white or light color is desirable to increase light reflection and insure good optical contrast. Typical insulating substances are BeO, MgO,ZnO, $Al_2O_3$, $Ga_2O_3$, $Sc_2O_3$, $Y_2O_3$, $La_2O_3$, $Gd_2O_3$, $SiO_2$, and mixed oxide compounds of the above such as $BeAl_2O_4$, $ZnGa_2O_4$, $MgAl_2O_4$, $Be_3Al_2Si_3O_{12}$, $GdAlO_3$, etc. Also useful are insoluble mixed-oxide compounds containing alkali-metal ions. Typical examples are $NaAlSi_2O_6$ and $NaYO_2$. Transition-metal oxides may also be used provided they are insoluble and do not contain impurities which make them semiconducting. Typical examples are $TiO_2$, $BaTiO_3$, $ZrO_2KTaO_3$, etc.

Particularly good results for low threshold displays are obtained by the use of alkali-metal alumino silicates (zeolites commercially known as molecular sieves). This is believed to be due to small particle size and the fact that they decompose sufficiently to induce a permanent presence of colored anthraquinoide particles that can be modulated electrically. Zeolites are readily available and inexpensive. These substances may offer other advantages such as absorption of water inadvertently entering the display device and absorption of gas products. These properties increase device lifetime. The compound $NaAlSi_2O_8$ (commercially known as 4 A molecular sieve) is preferred for low threshold displays because of extremely small particle size and easy availability. Mixtures of compounds are often useful as the insulator substance. A typical example is $NaAlSi_2O_8$ and $Al_2O_3$. For $TiO_2$ as the semiconductor substance and $NaAlSi_2O_8$ as the insulator substance, a concentration range from 30 to 70 weight percent semiconductor, remainder insulating substance gives excellent results.

Useful opacifier compositions are as follows:

a. 1 gm $TiO_2$—2 gm 4 A molecular sieve.
b. 1 gm $TiO_2$—1 gm $Al_2O_3$.
c. 1 gm $TiO_2$—1 gm 4 A sieve—4 gm $Al_2O_3$.
d. 1 gm $TiO_2$—2 gm $Al_2O_3$.

The use of silver halides (i.e., AgI) is also advantageous particularly for devices with sharp thresholds around 1–2 volts. The silver halides may prevent accumulation of colored particles in the device. Halide additions (i.e., iodine) may serve the same purpose. This may be due to the fact that quinone anions give up electrons to $Ag^+$ or $I_2$ so as to revert to the neutral, uncolored state.

The reference cell may vary in structure depending on application and use. Generally, the reference cell consists of two transparent substrates (e.g., glass or plastic), which enclose a volume containing the active medium, often in the form of a paste. Electrical contact with the active medium may be provided in a variety of ways, including transparent contacts (e.g., indium-tin oxide, $SnO_2$, etc.) mounted on the inside (side facing and in contact with the active medium) of the transparent substrates. Polarity is arranged so that electrodeposition occurs on the front face. The conducting material may be put down on the transparent substrates in predetermined shapes so as to form numbers, letters, etc. Various geometric shapes for producing figures, letters, numbers etc. may also be used. A typical example is the seven segment numeral display extensively used in display devices as calculators, watches, etc.

Some aspects of the structural aspects of the display are given by L. Mantell and S. Zaromb in *J. Electrochemical Society* 109, 992–993 (1962), L. G. Van Uitert, et al, *Applied Physics Letters* 34, p. 232 (1979).

In general, high concentration ranges are preferred because of lower power consumption and more distinct displays. For the organic quinone, a concentration between half saturation and saturation is generally preferred. Concentrations in the range from 0.005 to 0.30 grams per gram of solvent are useful for the organic quinone with 0.01 to 0.20 preferred. This concentration range gives a distinct display at low power consumption. Electrolyte composition may also vary over large limits. Particularly useful for $NH_4I$ is the range from 0.001 to 0.15 grams per gram of solvent. Preferred is the range from 0.005 to 0.10 grams per gram of solvent. Silver iodide when used is useful up to 0.08 grams per gram of solvent with the range from 0.005 to 0.05 grams per gram of solvent preferred. Thickners such as cellulose acetate or polyvinyl acetate may also be used. They are most useful up to a concentration of 0.08 grams per gram of solvent and preferred in the range of from 0.005 to 0.25.

When opacifier comprises $TiO_2$ and $Al_2O_3$, useful concentration ranges are 0.010 to 0.50 grams $TiO_2$ per gram of solvent and 0.100 to 1.00 grams $Al_2O_3$. Preferred ranges are 0.050 to 0.30 grams of $TiO_2$ per gram solvent and 0.200 to 0.70 grams of $Al_2O_3$ per gram of solvent. A typical solvent is N,N-dimethylformamide.

Several examples of cell compositions that provide for a sharp threshold may serve to illustrate the invention. In the table below, TBAQ stands for 2-tertiarybutyl19,10-anthraquinone, BQ stands for benz-[α]anthracene-7,12dione, TBAI stands for tetrabutylammonium iodide and THpAI stands for tetraheptylammonium iodide DMF stands for N,N-dimethylformamide.

TABLE OF CONCENTRATIONS FOR EXAMPLES 1, 2, 3, 4, and 5
Concentration in GMS/GM DMF

| | Examples | | | | |
|---|---|---|---|---|---|
| Substance | 1 | 2 | 3 | 4 | 5 |
| TBAQ | | | | 0.177 | 0.185 |
| BQ | 0.061 | 0.026 | 0.035 | | |
| TBAI | 0.039 | 0.017 | | 0.056 | 0.081 |
| THpAI | | | 0.038 | | |
| $NH_4I$ | | | 0.002 | | |
| AgI | 0.025 | 0.010 | 0.013 | 0.037 | 0.025 |
| DMF | 1.00 | 1.00 | 1.00 | 1.00 | 1.00 |
| Cellulose Acetate | 0.218 | 0.094 | 0.175 | 0.237 | 0.153 |
| Semiconducting $TiO_2$ | 0.074 | 0.125 | 0.378 | 0.237 | 0.153 |
| $Al_2O_3$ | 0.293 | 0.50 | 0.378 | 0.60 | 0.549 |

Example 1 is a high concentration display which yields a green color. Examples 2 and 3 also exhibit green colors. Both examples 4 and 5 yield red displays. All five examples exhibit excellent contrast and wide angle viewing at exceptionally low power consumption.

An example of a cell that has a very low threshold of modulation comprises a paste wherein the components are in the weight ratios DMF (1.00), TBAQ (0.22), TBAI (0.10), $TiO_2$ (0.77), 4 A molecular sieves (1.1). This cell can be color modulated using a drive of less than 0.1 volts.

The invention is conveniently illustrated by a description of the FIGURE. The FIGURE shows a typical display device, 10, made in accordance with the invention. It comprises a lower transparent glass substrate, 11, a lower transparent electrical connection, 13, to the lower transparent electrical contact, 12. Spacers, 15, are used to offset the lower transparent glass substrate, 11, from the upper transparent glass substrate, 18, and seals, 14 and 16 are used to prevent leakage of the active material out of the cavity 20. In this particular device, the seals are made of wax paper. The inner surface of the upper transparent glass substrate, 18, also contains a transparent electrical conductor, 17, and electrical contact, 19. The cavity contains the active material made up of one or more anthraquinone-like substances and suitable organic solvent, electrolyte and opacifier.

What is claimed is:

1. An electrochemical display device comprising (a) positive and negative electrodes (b) electrochemical solution comprising organic solvent with pKa greater than 9, active species which change color under the influence of an electrical signal and electrolyte consisting essentially of ammonium halide characterized in that the active species comprises organic quinone selected from the group consisting of benzoquinone, naphthaquinone, anthraquinone, benzanthrenequinone, diphenylquinone, dibenzanthraquinone, phenanthrenequinones, benz[α]anthracene-7,12dione, ethylanthraquinone, tertiarybutylanthraquinone, isoviolanthrone, pyrenequinone, perylenequinone, chrysenequinone, benzpyrenequinone, pyranthrone, flavanthrone and anthanthrone.

2. The electrochemical display device of claim 1 in which the organic quinone is selected from the group consisting of 2-ethylanthraquinone, 2-tertiary-butylanthraquinone and benz[α]anthracene-7,12dione.

3. The electrochemical display device of claim 1 in which the solvent has a pKa value greater than 12.

4. The electrochemical display device of claim 3 in which the solvent is selected from the group consisting of dimethylsulfoxide, N,N-diethylformamide, and N,N-dimethylformamide.

5. The electrochemical display device of claim 1 in which the electrolyte comprises ammonium iodide.

6. The electrochemical display device of claim 1 in which the electrolyte comprises ammonium bromide.

7. The electrochemical display device of claim 1 in which the electrochemical solution comprises in addition opacifier.

8. The electrochemical display device of claim 7 in which the opacifier comprises solid semiconductor substances and solid insulator substance.

9. The electrochemical display device of claim 8 in which the solid semiconducting substance has a conductivity of at least $10^{-9}$ mhos/cm at room temperature.

10. The electrochemical display device of claim 8 in which the opacifier comprises 1–90 weight percent solid semiconductor substance, remainder solid insulator substance.

11. The electrochemical display device of claim 10 in which the opacifier comprises 20–70 weight percent solid semiconductor substance, remainder solid insulator substance.

12. The electrochemical display device of claim 11 in which the opacifier consists essentially of 40–60 weight percent solid semiconductor substance, remainder solid insulator substance.

13. The electrochemical display device of claim 8 in which the solid semiconductor substance consists essentially of at least one suitably doped compound selected from the group consisting of uncolored, transition metal oxides, said suitable doping comprising an impurity of such valence as to make the transition-metal oxide p-type or n-type and in sufficient quantity to make the oxide semiconducting.

14. The electrochemical display device of claim 13 in which the solid semiconducting substance consists essentially of at least one suitably doped compound selected from the group consisting of $TiO_2$, $ZrO_2$, $GeO_2$, $Nb_2O_5$, and $Ta_2O_5$, said suitable doping comprising an impurity of such valence as to make the transition-metal oxide p-type or n-type and in sufficient quantity to make the oxide semiconducting.

15. The electrochemical display device of claim 14 in which the dopant concentration ranges from 0.001 to 1.0 weight percent.

16. The electrochemical display device of claim 14 in which the semiconductor material is doped $TiO_2$.

17. The electrochemical display device of claim 16 in which the dopant is iron in the concentration range of 0.005 to 0.025 weight percent.

18. The electrochemical display device of claim 8 in which the insulating substance is selected from the group consisting of BeO, MgO, ZnO, $Al_2O_3$, $Ga_2O_3$, $Sc_2O_3$, $Y_2O_3$, $La_2O_3$, $Gd_2O_3$, $SiO_2$, $Gd_2O_3$, $SiO_2$, $BeAl_2O_4$, $ZnGa_2O_4$, $BeAl_2O_4$, $ZnGa_2O_4$, $MgAl_2O_4$, $Be_3Al_2Si_3O_{12}$, $GdAlO_3$, $NaAlSi_2O_6$ and $NaYO_2$.

19. The electrochemical display device of claim 8 in which the insulator substance consists essentially of a transition metal oxide sufficiently pure to be insulating.

20. The electrochemical device of claim 19 in which the insulating substance is selected from the group consisting of $NaAlSi_2O_5$ and $Al_2O_3$.

21. The electrochemical device of claim 1 in which the electrochemical solution comprises in addition silver halide.

22. The electrochemical device of claim 1 in which the electrochemical solution comprises in addition quaternary ammonium halide.

23. The electrochemical device of claim 21 or 22 in which the halide is iodide.

24. The electrochemical device of claim 1 in which the electrochemical solution comprises in addition a halogen.

25. The electrochemical device of claim 24 in which the halogen is iodine.

26. The electrochemical device of claim 1 in which the organic quinone is added as a quinoide salt.

* * * * *